United States Patent
Ahrens et al.

(10) Patent No.: US 9,432,327 B2
(45) Date of Patent: *Aug. 30, 2016

(54) FACILITATING INTERACTION AMONG USERS OF A SOCIAL NETWORK

(71) Applicant: Facebook, Inc., Menlo Park, CA (US)

(72) Inventors: Spencer Greg Ahrens, Menlo Park, CA (US); Cameron Alexander Marlow, Menlo Park, CA (US); Lars Seren Backstrom, Mountain View, CA (US); Chaitanya Mishra, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,464

(22) Filed: Sep. 4, 2015

(65) Prior Publication Data

US 2015/0381556 A1    Dec. 31, 2015

Related U.S. Application Data

(63) Continuation of application No. 12/829,338, filed on Jul. 1, 2010, now Pat. No. 9,177,346.

(51) Int. Cl.
    *G06F 17/30* (2006.01)
    *H04L 12/58* (2006.01)
    *G06Q 10/10* (2012.01)
    *G06Q 50/00* (2012.01)
    *H04W 4/20* (2009.01)
    *G06F 3/0484* (2013.01)
    *H04L 29/06* (2006.01)

(52) U.S. Cl.
    CPC ........... *H04L 51/32* (2013.01); *G06F 3/04842* (2013.01); *G06F 17/30598* (2013.01); *G06F 17/30867* (2013.01); *G06Q 10/10* (2013.01); *G06Q 50/01* (2013.01); *H04L 51/12* (2013.01); *H04L 65/403* (2013.01); *H04W 4/206* (2013.01)

(58) Field of Classification Search
    None
    See application file for complete search history.

(56) References Cited

U.S. PATENT DOCUMENTS

| 2007/0162432 | A1 | 7/2007 | Armstrong |
| 2010/0036934 | A1* | 2/2010 | Bruster ................... G06F 17/30 709/219 |
| 2010/0205541 | A1* | 8/2010 | Rapaport ............... G06Q 10/10 715/753 |

FOREIGN PATENT DOCUMENTS

| JP | 2007-334502 A | 12/2007 |
| JP | 2010-113489 A | 5/2010 |
| WO | WO 2009/105277 | 8/2009 |

OTHER PUBLICATIONS

European Search Report from EP Application No. 11801374.7, Jul. 31, 2015.
Chinese Office Action for Chinese Patent Application No. 201180032752.0, from the State Intellectual Property Office (SIPO) of the People's Republic of China, Dec. 25, 2015.
Chinese Office Action for Chinese Patent Application No. 201180032752.0, from the State Intellectual Property Office (SIPO) of the People's Republic of China, Apr. 12, 2016.

* cited by examiner

*Primary Examiner* — Anh Tai Tran
(74) *Attorney, Agent, or Firm* — Baker Botts L.L.P.

(57) ABSTRACT

In one embodiment, a computing device receives an indication of a first user action by a first user. The computing device determines a topic of the first user action based on analyzing content associated with the first user action, and determines whether the first user has a preference to exclude posts associated with the topic or a category associated with the topic. If the first user has not indicated any preference to exclude posts associated with the topic or the category, then the computing device identifies a second user action by a second user and related to the topic, and determines whether the first user has indicated a preference to exclude posts associated with the second user. If the first user has not indicated any preference to exclude posts associated with the second user, a reference associated with the second user action is sent to the first user.

20 Claims, 8 Drawing Sheets

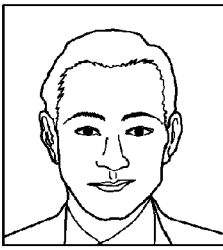

Colin Lee Baker

| Wall | Info | Photos | Boxes |
| 401a | 401b | 401c | 401d |

403

View Photos of Me (57)
Edit My Profile

Write something about yourself.

Information

Relationship Status:
In a Relationship

Birthday:
March 23, 1981

Current City:
Santa Clara, CA

Hometown:
Medina, OH

402 — Basic Information          Edit Information

| | | |
|---|---|---|
| Sex: | Male | 440 — edit |
| Current City: | Santa Clara, CA | |
| Birthday: | March 23, 1981 | |
| Hometown: | Medina, OH | |
| Relationship Status: | In a Relationship | |
| Looking For: | Friendship<br>Networking | |
| Political Views: | Liberal | |

406 — Personal Information

| | | |
|---|---|---|
| 408 — Activities: | Weight Lifting, hiking;<br>Playing Pingpong foozball | 440 — edit |
| 410 — Interests: | reading, photography | |
| 412 — Favorite Music: | rock, Classical | |
| 414 — Favorite TV Shows: | south park, family guy, Msntx: | |
| 416 — Favorite Movies | Seven Pounds, Anything with Johnny Depp | |
| 418 — Favorite Books: | The Da Vinci Code, Touching The Void, Tolkien | |
| 420 — Favorite Quotations: | Genius is one per cent inspiration,<br>ninety-nine per cent perspiration | |
| 422 — About Me: | I try to strike a balance in life | |

424 — Contact Information

| | | |
|---|---|---|
| Email: | cbaker@gmail.com | 440 — edit |
| Mobile Number: | 408-555-5555 | |
| Current City: | San Jose, CA | |

Education and Work

426

| | | |
|---|---|---|
| Grad School: | Stanford '06<br>Master of Science, Electrical Engineering | 440 — edit |
| College: | The University of Akron '04<br>Physics, Biomedical Engineering | |
| High School: | Highland High School '99 | |
| Employer: | International Bank | |
| Position: | Personal Loan Agent | |
| Time Period: | October 2008 - Present | |
| Location: | Sacramento, CA | |
| Description: | Intellectual Property Law | |

Friends — 428
188 friends          See All

  
Sally      Ben        Jane
Jacobs     Shuster    Fraser

429

  
Dan        Ann        Jim
Hill       Francis    Armstead

*FIG. 4A*

FIG. 7 facebook | Search | Home  Profile  Account ▾

Profile

Volcanic Eruption in Iceland
Current Event
👍 Like _____ Write on Wall
Description From Wikipedia, the free ency The 2010 eruptions of Eyjafjallajökull are a series of major volcanic events at Eyjafjallajökull in Iceland. They caused significant disruption to air travel across western and northern Europe in 2010. Seismic activity started at the end of 2009 and led to a volcanic eruption of Volcanic Explosivity Index (VEI) 1 on 20 March 2010.[1] The plume of ash from a later ongoing eruption beginning on 14 April 2010 led to widespread disruption of air travel from 15 April, with much of the airspace in Europe closed until 20 April, causing cancellation of most flights within, to, and from Europe. The second ongoing eruption on 14 April 2010 resulted in an estimated 110 million cubic meters of ejected tephra during eruption, and the plume rose explosively to about 9 kilometres (30,000 ft) into the air, which makes it a (VEI 4) on the Volcanic Explosivity Index (preliminary estimate).[2]

Volcanoes are generally found where tectonic plates are diverging or converging. A mid-oceanic ridge, for example the Mid-Atlantic Ridge, has examples of volcanoes caused by divergent

— 722

Add your own message.
— 732
Attach: 📷 📹 📅 📎 ▾        Share — 734
— 730

Related Posts by Friends
Erin Mason Volcanoes blow (literally). We'll see when I can get home.
Ack!
April 17 at 11:59am • Comment • Like • View Feedback (6)
— 742  — 744  — 746
— 738

Related Global Posts
Tierra Barns it probably means i'm a nerd, but volcanoes are named after the roman god Vulcan. Yay Star Trek!!!
12 seconds ago
Andy F Dick Holidays No volcanoes LETS RE - BOOK TURKEY
about a minute ago
— 740

— 736

— 724

Related Posts
W Wikipedia — 728
Fans
Helen May
Westwood High — 728
School
Alex Graham
— 726

Jen Branson
SIU Carbondale
John Smith
Bistra Angelo
Stanford
John Osmand
Adrian Valero
Rice
— 726

Create a Page

FACILITATING INTERACTION AMONG USERS OF A SOCIAL NETWORK

PRIORITY

This application is a continuation under 35 U.S.C. §120 of U.S. patent application Ser. No. 12/829,338, filed 1 Jul. 2010.

TECHNICAL FIELD

The present disclosure relates generally to social networking, and more particularly, to facilitating interaction among users of a social network environment by, in various example embodiments, presenting to a user who has submitted a post or taken some action with respect to the social network environment, a number of related posts and furthermore, providing a number of interactive elements with which the user can interact with the related posts and/or the authoring users of the related posts.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

BRIEF DESCRIPTION OF THE DRAWINGS

FIGS. 4A-4B each illustrates an example user profile page.

FIG. 7 illustrates an example topic profile page.

DESCRIPTION OF EXAMPLE EMBODIMENTS

Figure 1:
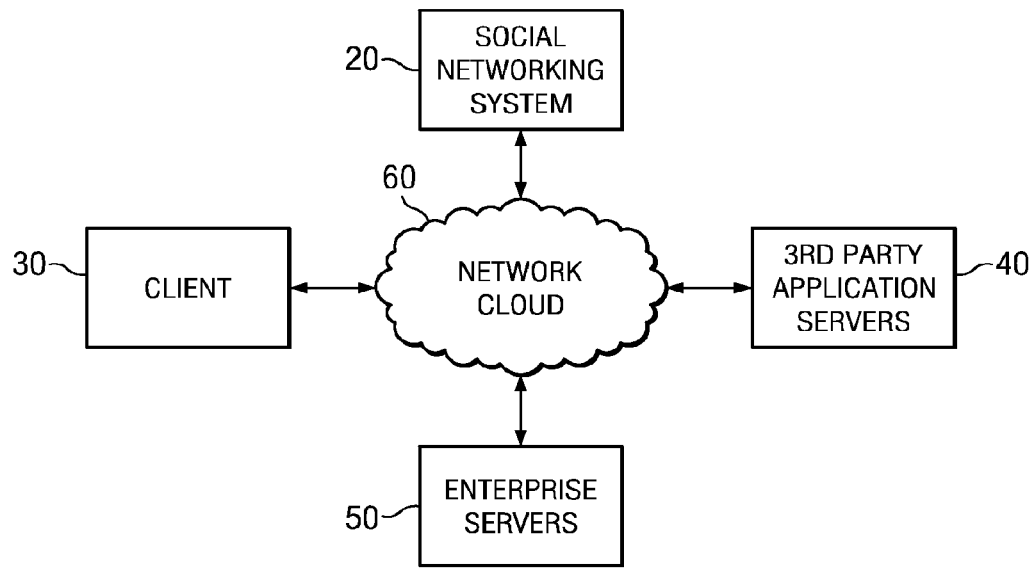
FIG. 1 illustrates an example computer network environment of an example social network environment.

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of a social network system implementing the social network environment include, store, or have access to one or more data structures that include a social graph for use in implementing the social network environment described herein. In particular embodiments, the social graph includes user nodes that each correspond to a respective user of the social network environment. The social graph may also include other nodes such as concept nodes each devoted or directed to a particular concept as well as topic nodes, which may or may not be ephemeral, each devoted or directed to a particular topic of current interest among users of the social network environment. In particular embodiments, each node has, represents, or is represented by, a corresponding web page ("profile page") hosted or accessible in the social network environment. By way of example, a user node may have a corresponding user profile page in which the corresponding user can add content, make declarations, and otherwise express himself or herself. By way of example, as will be described below, various web pages hosted or accessible in the social network environment such as, for example, user profile pages, concept profile pages, or topic profile pages, enable users to post content, post status updates, post messages, post comments including comments on other posts submitted by the user or other users, declare interests, declare a "like" (described below) towards any of the aforementioned posts as well as pages and specific content, or to otherwise express themselves or perform various actions (hereinafter these and other user actions may be collectively referred to as "posts" or "user actions"). In some embodiments, posting may include linking to, or otherwise referencing additional content, such as media content (e.g., photos, videos, music, text, etc.), uniform resource locators (URLs), and other nodes, via their respective profile pages, other user profile pages, concept profile pages, topic pages, or other web pages or web applications. Such posts, declarations, or actions may then be viewable by the authoring user as well as other users. In particular embodiments, the social graph further includes a plurality of edges that each define or represent a connection between a corresponding pair of nodes in the social graph.

In particular embodiments, when a user submits a post such as, by way of example, those just described, or performs some other action such as, by way of example, typing a word or query into a search box, clicking on a hyperlink, or even just visiting a particular page, the post or action is received or detected by the social network system described herein. The social network system analyzes the content of the post (e.g., the words, media, or other content in the post, or in the case of a "like", the words, media, or other content in the "liked" post) or various information associated with the performed action (e.g., the word(s) entered in the search box, the information accessed when clicking the hyperlink, or the information provided in the requested web page) to determine or extract one or more topics of the post (e.g., the theme, main idea, or subject of the post) or topics associated with the performed action (e.g., the topic, theme, main idea, title, or subject of the search or accessed page). Subsequently, the social network system searches a database or index of topics and a correlated database of previously received posts from other users to identify any related posts from the other users that share one or more of the same or similar topics. In particular embodiments, the social network system then transmits for presentation to the user one or more related posts or information about the related posts including, by way of example, text or other content as well as, in particular embodiments, information regarding the authoring users of the related posts. In one implementation, the related posts may be transmitted in substantially real-time relative to the post submitted or action performed by the user such that the user is presented with one or more related posts in close temporal proximity. The identification and presentation of related posts form a basis for enabling spontaneous conversations around the topic or topics of the user's posts or actions and related posts. More particularly, the social network system may search a database or index of topics to identify one or more related posts stored in a database of posts having the greatest or at least a threshold relevance to the user's submitted post or detected action and present one or more of the related posts, or information associated with the related posts, to the user in one or more of a number of forms, and in particular embodiments, with one or more interactive elements. In particular embodiments, the interactive elements enable the user to view the related posts or information associated with the related posts and to comment on or otherwise interact with the related posts or the authoring users of the related posts by way of the interactive elements presented with the respective related posts or other information associated with the related posts. In this way, the social network environment facilitates interaction amongst the user and the authoring users of the related posts, and in particular embodiments, without additional input by the user submitting the post or performing the action. That is, in particular embodiments, the social network system searches and identifies related posts without requiring further instruction by the user after the user submits his or her own post or performs certain actions.

In one example embodiment, the conversations facilitated by the social network environment may be realized as one or more feeds of posts and corresponding comments on such posts presented to the authoring users of the submitted and related posts including, in one embodiment, a live-updating commenting mechanism. By way of example, if a first user submits a first post and a second user subsequently submits a second post related to the same topic as the first post, the social network system may present the second user with the first user's post or information about the first user's post or the first user and, furthermore, provide the second user with one or more interactive elements or mechanism by which to comment on, converse about, or otherwise interact with the first post or a topic shared between the first and second posts. In particular embodiments, the social network system also notifies the first user when the second user or other users submitting related posts comment on or interact with the first user's post. In another example embodiment, the conversations may be realized with an interactive topic chat room type setting. In yet another example embodiment, the social network system may direct the user who submitted the post to a web page or other outlet directed to the topic of the post enabling users to converse about the topic.

The associations between posts may be made based on one or more of several factors. In particular embodiments, the primary factor for identifying posts related to a user's just submitted post or performed action, or the determination of which related posts are most relevant and are to be presented to the user, is the topic or topics of the submitted post or topic or topics associated with the user action. Other factors may include, by way of example, the geographic proximity or social graph proximity of the user to the authoring users of related posts, the times the respective related posts were submitted, the popularity or "trendiness" of the topic or topics of the submitted post, or the relation of the topic of the related posts to interests of the user as identified by analyzing information declared by the user and stored with the user's profile. In particular embodiments, the social network system may identify and track global trending topics that are popular across the entire social network environment (e.g., all users of the social network environment) or trending topics that are popular across a portion of the social network environment (e.g., users within a particular geographic location or region or within a social proximity of users as defined in the social graph). In one embodiment, the social network system only presents related posts to a user who has just submitted a post if the topic of the submitted post is determined to be a global trending topic or a trending topic of users in geographic or social proximity to the user who has just submitted the post. In other embodiments, the user may configure one or more settings to dictate when the social networking system should present related posts to the user. By way of example, a user may specify in advance one or more settings such that the user is only presented with related posts in response to submitting a post when the topic of the user's post is determined to be a trending topic, or such that the user is only presented with related posts authored by users that are friends of the user or friends of friends of the user, related posts authored by users in the same geographic region, related posts submitted within a specified period of time prior to and relative to the user's post, or a combination of these or other settings. The user may also be enabled to specify posts or content that the user does not want to be presented with, such as posts of certain topics or topic categories, or posts from certain users or groups of users.

In particular embodiments, a goal is to facilitate the most engaging conversations amongst posting users by the intelligent selection of related posts, as well as the intelligent selection of the pool of other authoring users from which to search and identify related posts to be presented to a user after the user submits a post or performs a certain action. Users of the social network environment often submit posts about the same or similar topics as other users within a short time window and may or may not be aware that others users are also submitting such posts. The social network environment facilitates the engagement of users across the social network environment by exposing the users to posts made by other users about the same or similar topics such that these users can continue to share ideas or otherwise express themselves with regard to a shared topic of interest thereby stimulating and facilitating conversations amongst these users who may generally not know each other. Hence, particular embodiments stimulate, facilitate, or accelerate interactions amongst users including interactions between users who are not friends of one another, users who are not located within the same geographic region, or users who are not connected directly or indirectly in the social graph. This increased engagement amongst users may generally fuel the overall growth and health of the social network.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

As just described, in various example embodiments, one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. As used herein, a "registered user" refers to a user that has officially registered within the social network environment (Generally, the users and user nodes described herein refer to registered users only, although this is not necessarily a requirement in other embodiments; that is, in other embodiments, the users and user nodes described herein may refer to users that have not registered with the social network environment described herein). In particular embodiments, each user has a corresponding "profile" page stored, hosted, or accessible by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. As used herein, an "authenticated user" refers to a user who has been authenticated by the social network environment as being the user claimed in a corresponding profile page to which the user has administrative rights or, alternately, a suitable trusted representative of the claimed user.

As used herein, a "connection" may represent a defined relationship between users or concepts of the social network environment, which can be defined logically in a suitable data structure of the social network environment and can be used to define a relationship (hereinafter referred to as an edge) between the nodes corresponding to the users or concepts of the social network environment for which the connection has been made. As used herein, a "friendship" represents a connection, such as a defined social relationship, between a pair of users of the social network environment. A "friend," as used herein, may refer to any user of the social network environment with which another user has formed a connection, friendship, association, or relationship with, causing an edge to be generated between the two users. By way of example, two registered users may become friends with one another explicitly such as, for example, by one of the two users selecting the other for friendship as a result of transmitting, or causing to be transmitted, a friendship request to the other user, who may then accept or deny the request. Alternately, friendships or other connections may be automatically established. Such a social friendship may be visible to other users, especially those who themselves are friends with one or both of the registered users. A friend of a registered user may also have increased access privileges to content, especially user-generated or declared content, on the registered user's profile or other page. It should be noted, however, that two users who have a friend connection established between them in the social graph may not necessarily be friends (in the conventional sense) in real life (outside the social networking environment). For example, in some implementations, a user may be a business or other non-human entity, and thus, incapable of being a friend with a human being user in the traditional sense of the word.

As used herein, a "fan" may refer to a user that is a supporter of a particular web page, web application, or other web content accessible in the social network environment. In particular embodiments, when a user is a fan of a particular web page ("fans" the particular web page), the user may be listed on that page as a fan for other registered users or the public in general to see. Additionally, an avatar or profile picture of the user may be shown on the page (or in/on any of the pages described below). As used herein, a "like" may refer to something, such as, by way of example and not by way of limitation, a post, a comment, an interest, a link, a piece of media (e.g., photo, photo album, video, song, etc.) a concept, an entity, or a page, among other possibilities (in some implementations a user may indicate or declare a like to or for virtually anything on any page hosted by or accessible by the social network system or environment), that a user, and particularly a registered or authenticated user, has declared or otherwise demonstrated that he or she likes, is a fan of, supports, enjoys, or otherwise has a positive view of. In one embodiment, to indicate or declare a "like" or to indicate or declare that the user is a "fan" of something may be processed and defined equivalently in the social networking environment and may be used interchangeably; similarly, to declare oneself a "fan" of something, such as a concept or concept profile page, or to declare that oneself "likes" the thing, may be defined equivalently in the social networking environment and used interchangeably herein. Additionally, as used herein, an "interest" may refer to a user-declared interest, such as a user-declared interest presented in the user's profile page. As used herein, a "want" may refer to virtually anything that a user wants. As described above, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a celebrity, a person who is not a registered user, or even, in some embodiments, another user (e.g., a non-authenticated user), etc. By way of example, there may be a concept node and concept profile page for "Jerry Rice," the famed professional football player, created and administered by one or more of a plurality of users (e.g., other than Jerry Rice), while the social graph additionally includes a user node and user profile page for Jerry Rice created by and administered by Jerry Rice, himself (or trusted or authorized representatives of Jerry Rice).

In particular embodiments, as will be described in more detail below, a friend connection or friendship may define or indicate a logical connection defined or represented by an edge between user nodes in the social graph, while a like, want, fan, or other connection demonstrating, generally, an interest or association, may define a logical connection or edge between a user node and a concept node in the social graph (and in some embodiments, between two user nodes, or between two concept nodes).

Particular embodiments may operate in, or in conjunction with, a wide area network environment, such as the Internet, including multiple network addressable systems. FIG. 1 illustrates an example network environment, in which various example embodiments may operate. Network cloud 60 generally represents one or more interconnected networks, over which various systems and hosts described herein may communicate. Network cloud 60 may include packet-based wide area networks (such as the Internet), private networks, wireless networks, satellite networks, cellular networks, paging networks, and the like. As FIG. 1 illustrates, particular embodiments may operate in conjunction with a network environment comprising social network environment 20 and client devices 30, as well as, in some embodiments, one or more third party web application servers 40 or one or more enterprise servers 50. Client devices 30, web application servers 40, and enterprise servers 50 may be operably connected to the network environment and network cloud 60 via a network service provider, a wireless carrier, a set of routers or networking switches, or any other suitable means.

Figure 2:
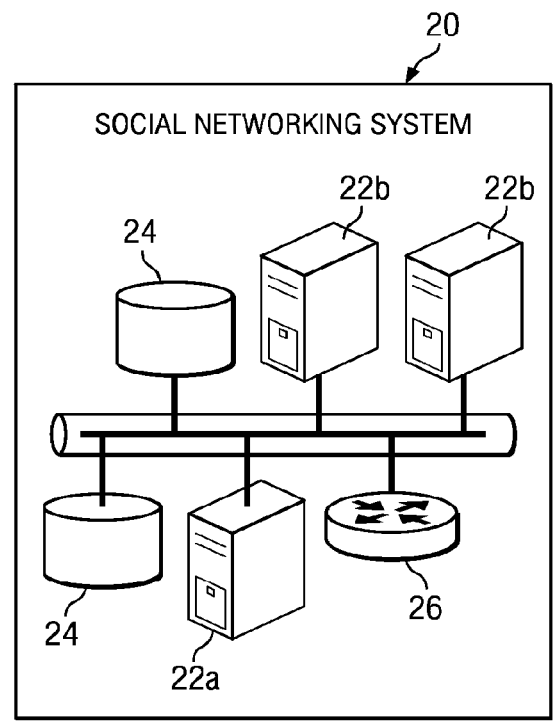
FIG. 2 illustrates example components of an example social network environment.

In one example embodiment, social network environment 20 comprises computing systems that allow users at client devices 30 to communicate or otherwise interact with each other and access content, such as user profiles, as described herein. Social network environment 20 is a network addressable system that, in various example embodiments, comprises one or more physical servers 22a or 22b (hereinafter also referred to collectively as servers 22) as well as one or more data stores collectively referred to herein as data store 24 (which may be implemented in or by one or more of a variety of consolidated or distributed computing systems, databases, or data servers), as illustrated in FIG. 2. The one or more physical servers 22 are operably connected to computer network 60 via, by way of example, a set of routers or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social network environment 20. By way of example, social network environment 20 may host a website that allows one or more users, at one or more client devices 30, to view and post information, as well as communicate with one another via the website, web pages, or web applications. Hereinafter, servers 22 may be referred to as server 22, although, as just described, server 22 may include numerous servers hosting, for example, social network environment 20, as well as other content distribution servers, data stores, or databases. Data store 24 may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate or integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social network environment 20 users, client devices 30, web application servers 40, or enterprise servers 50, as well as, in particular embodiments, data associated with various concepts and topics. As described above, particular embodiments relate to a social network environment 20 that includes a platform enabling an integrated social network environment. In the following example embodiments, the social network environment may be described or implemented in terms of a social graph including social graph information. In particular embodiments, data store 24 includes a social graph database 204 in which the social graph information for use in implementing the social network environment described herein is stored. In particular embodiments, the social graph information stored by social network environment 20 in data store 24, and particularly in social graph database 204, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users, concepts, or topics (as described below), some of which is actually rendered on corresponding profile or other pages. The nodes may also include pointers or references to other objects, data structures, or resources for use in rendering content in conjunction with the rendering of the profile pages corresponding to the respective nodes.

In particular embodiments, the plurality of nodes and edges in the social graph are stored as data objects in data store 24, and particularly social graph database 204, as described above. Additionally, as will be described later, data store 24 may further include one or more searchable or queryable data bases, data stores, and indexes of nodes or edges generated by indexing social graph database 204 and other content received from or on behalf of users or other sources. In particular embodiments, the plurality of nodes includes a first set of administered nodes. In particular embodiments, the first set of administered nodes are user-administered nodes (hereinafter referred to as "user nodes") that each correspond to a respective user and a respective user profile page of that user. In particular embodiments, user profile pages corresponding to user nodes may be modified, written to, or otherwise administered by, and only by, their respective owner (registered) users (unless an official administrator of social network environment 20 in general desires or requires access to modify or delete a user's profile page, e.g., as a result of scrupulous or otherwise inappropriate action on the part of the registered user).

Figure 3:
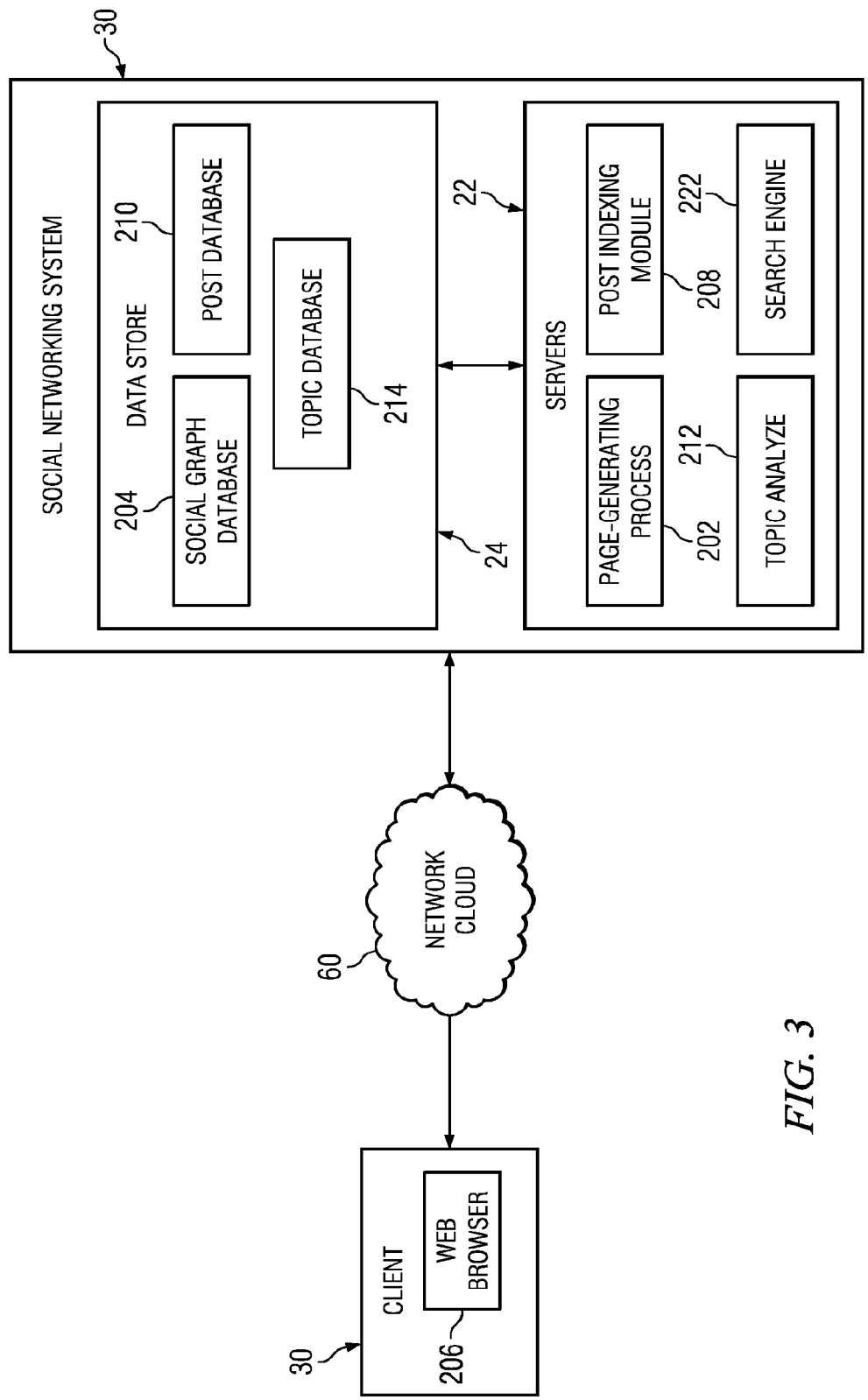
FIG. 3 illustrates an example architecture of the example social network environment of FIG. 2 and an example architecture of an example client device of FIG. 1.

Each client device 30, web application server 40, or enterprise server 50 may generally be a computer, computing system, or computing device (such as that described below with reference to FIG. 8) including functionality for communicating (e.g., remotely) over a computer network. Client device 30 in particular may be a desktop computer, laptop computer, personal digital assistant (PDA), in- or out-of-car navigation system, smart phone or other cellular or mobile device, or mobile gaming device, among other suitable computing devices. Client device 30 may execute one or more client applications, such as a web browser 206 (e.g., MICROSOFT WINDOWS INTERNET EXPLORER, MOZILLA FIREFOX, APPLE SAFARI, GOOGLE CHROME, AND OPERA, etc.), as illustrated in FIG. 3, to access and view content over a computer network 60. In particular implementations, the client applications allow a user of client device 30 to enter addresses of specific network resources to be retrieved, such as resources hosted by social network environment 20, web application servers 40, or enterprise servers 50. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 30 desires to view a particular web page (hereinafter also referred to as a target structured document) hosted by social network environment 20, or a web application hosted by a web application server 40 and made available in conjunction with social network environment 20, the user's web browser 206, or other client-side structured document rendering engine or suitable client application, formulates and transmits a request to social network environment 20. The request generally includes a URL or other document identifier as well as metadata or other information. By way of example, the request may include information identifying the user, such as a user identifier, as well as information identifying or characterizing the web browser 206 or operating system running on the user's client computing device 30. The request may also include location information identifying a geographic location of the user's client device or a logical network location of the user's client device, as well as timestamp identifying when the request was transmitted.

In an example implementation and as illustrated in FIG. 3, when a request for a web page or structured document hosted by social network environment 20 is received by the social network environment 20, one or more page-generating processes 200 executing within the social network environment 20 typically generate a base web page in the form of a Hyper Text Markup Language (HTML), Extensible Markup Language (XML), or other web browser-supported structured document. The generated structured document is then transmitted in a response, which may comprise one or more portions or partial responses, to the requesting client 30 via a Hypertext Transfer Protocol (HTTP) or other suitable connection for rendering by the web browser 206 at the client device 30. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social network environment 20 or at one or more external locations, to the client device 30 requesting the web page. Typically, upon receipt of the response, the web browser 206 or other client document rendering application running at the client device 30 then constructs a document object model (DOM) representation of the received structured document and requests the resource(s) (which may be at one or more other external locations) embedded in the document.

Figure 4B:
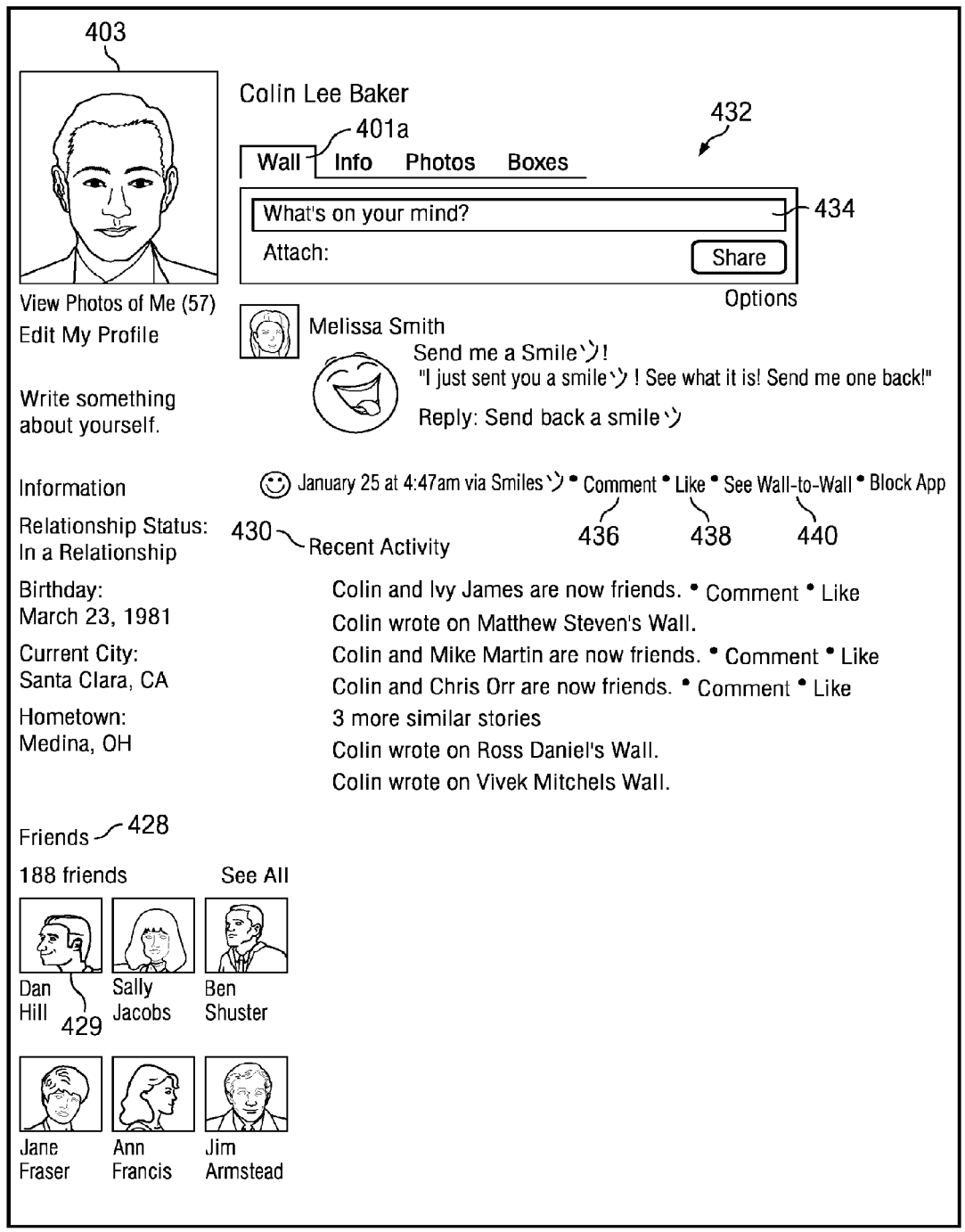

In an example implementation, when a user of social network environment 20 first requests a web page from social network environment 20 in a given user session, the response transmitted to the user's client device 30 from social network environment 20 may include a structured document generated by page-generating process 202 for rendering a login page at the client device. The user may then enter his or her user login credentials (e.g., user identifier and password), which are then transmitted from the user's client device 30 to social network environment 20. Upon successful authentication of the user, social network environment 20 may then transmit a response to the user's web browser 206 at the user's client device 30 that includes a structured document generated by page-generating process 202 for rendering a user homepage (see, for example, FIG. 5) or user profile page (see, for example, FIGS. 4A and 4B) at the user's client device.

FIG. 4A illustrates an example user profile page of a user corresponding to a user node. In particular embodiments, a user profile page is visible to the administering user of the page, the user's friends, and even other non-friend users depending on privacy settings, which, in particular embodiments, may be set or modified by the administering user via the user's profile page or a user homepage, for example. The user profile page may comprise a number of different subpages viewable or accessible via selecting one or more tabs 401 including, by way of example, Wall (feed) tab 401a, Info tab 401b, Photos tab 401c and Boxes tab 401d. By way of example, in the embodiment illustrated in FIG. 4A, Info tab 401b is selected. The information (Info) section displayed when Info tab 401b is selected generally displays information about the user of the respective profile page and enables the user to enter and display information about or related to the respective user. Similarly, a user may select Photos tab 401c to view photos uploaded by the administering user of the profile page, or enable the user of the profile page to upload, edit, or add captions to photos for viewing by the user or other users viewing the profile page. The administering user of the profile page may select a particular photo or picture uploaded in photos tab 401c for display as a user profile picture 403. In an example implementation, the user's profile picture 403 as well as other features such as, for example, the options to send a message to another user, edit the profile page, view friends of the user, or view photos of the user, may be displayed in a "chrome" (border) region of the page no matter which of tabs 401 is selected. In some implementations, a search bar or search interface is also rendered in the chrome of a user profile page (as well as other pages) enabling users to type in information such as names of other users, concepts, topics, or posts the user desires to search for.

Generally, a great portion of, or all of, the information accessible or visible to the user and other users via the user profile page is self-declared; that is, the user types or otherwise enters information or content in various sections or forms that may or may not automatically appear by default when the user profile page is created. In particular embodiments, a user may edit his or her user profile page at anytime the user is logged into social network environment 20. By way of example, user profiles include data that describe the respective users of the social network enabled by social network environment 20, which may include, for example, proper names (first, middle and last of a person, a trade name or company name of a business entity, etc.) biographic, demographic, and other types of descriptive information in a basic information section 402 under Info tab 401*b*. The basic information section 402 may further include a user's sex, current city of residence, birthday, hometown, relationship status, political views, what the user is looking for or how the user is using the social network (e.g., for looking for friendships, relationships, dating, networking, etc.), and the like.

In particular embodiments, a user profile page may also include a personal information section 406 where the user can enter more personal declarations. By way of example, a personal information section 406 may include a sub-section 408 in which the user may declare various activities he, she, or it participates in or enjoys such as, for example, sports or music. For example, in section 408, the user may declare these activities by, for example, simply listing the activities. For example, the user may list "weight lifting, hiking, playing Ping-Pong, and foosball," or may use phrases such as, for example, "I enjoy weightlifting, I like hiking, I love playing Ping-Pong, I'm good at foosball." The user may separate or delineate his or her declared activities (and other declarations described below) with, for example, commas, semicolons, dashes, or carriage returns. An example personal information section 406 may also include a sub-section 410 in which the user may declare various interests. Again, the user may simply list such interests, such as by typing, for example, "reading and photography," or by using phrases such as, for example, "I like to read, I like photography." As another example, interests section 406 may include a favorite music sub-section 412 in which the user may declare music he or she likes or is interested in, a favorite TV shows sub-section 414, a favorite movies sub-section 416, a favorite books sub-section 418, a favorite quotations sub-section 420, and even a general "about me" sub-section 422 in which the user may enter general declarations about himself or herself that may not fit under the previously described sections.

In particular embodiments, a user profile page may also include a contact information section 424 in which the user may enter various contact information including, for example, email addresses, phone numbers, and city of residence. A user profile page may also include an education and work section 426 in which the user may enter his or her educational history. By way of example, a user may declare that he or she attended Stanford University in section 426 by, for example, simply typing "Stanford University," by typing "I attended Stanford University," or by selecting Stanford University from a menu interface. The user may also describe more specific information, such as, for example, the degree awarded, the field of the degree, the graduation date, etc. As another example, section 426 may enable the user to enter the user's work experience. By way of example, a user may declare that he or she works at company Z by, for example, simply typing "Company Z," by typing "I work at Company Z," or selecting company Z from a menu.

In particular embodiments, a user profile page also includes a friends section 428 (which may be visible in the chrome or other region of the page) that displays all or a subset of the user's friends as defined by edges in the social graph stored in social graph database 204. In particular embodiments, the user may click on a name or thumbnail image 429 associated with a friend resulting in the directing of the user to the user profile page of the selected friend.

In particular embodiments, actions that a user takes with respect to another second user, whether or not the second user may be a friend of the user or not, and, in particular embodiments, actions that the user takes with respect to various concept, topic, or other nodes in general, may be displayed in a recent activity section 430, which may be viewable as a section or sub-section within a wall (feed) section 432 under Wall (feed) tab 401*a*. Generally, wall section 432 is a space on every user's profile page that allows the user and friends to post messages including text or other content via input box 434 for the user and friends to see, as well as to comment, like, or otherwise express themselves in relation to posts on the wall including to comments made to such posts.

Figure 5:
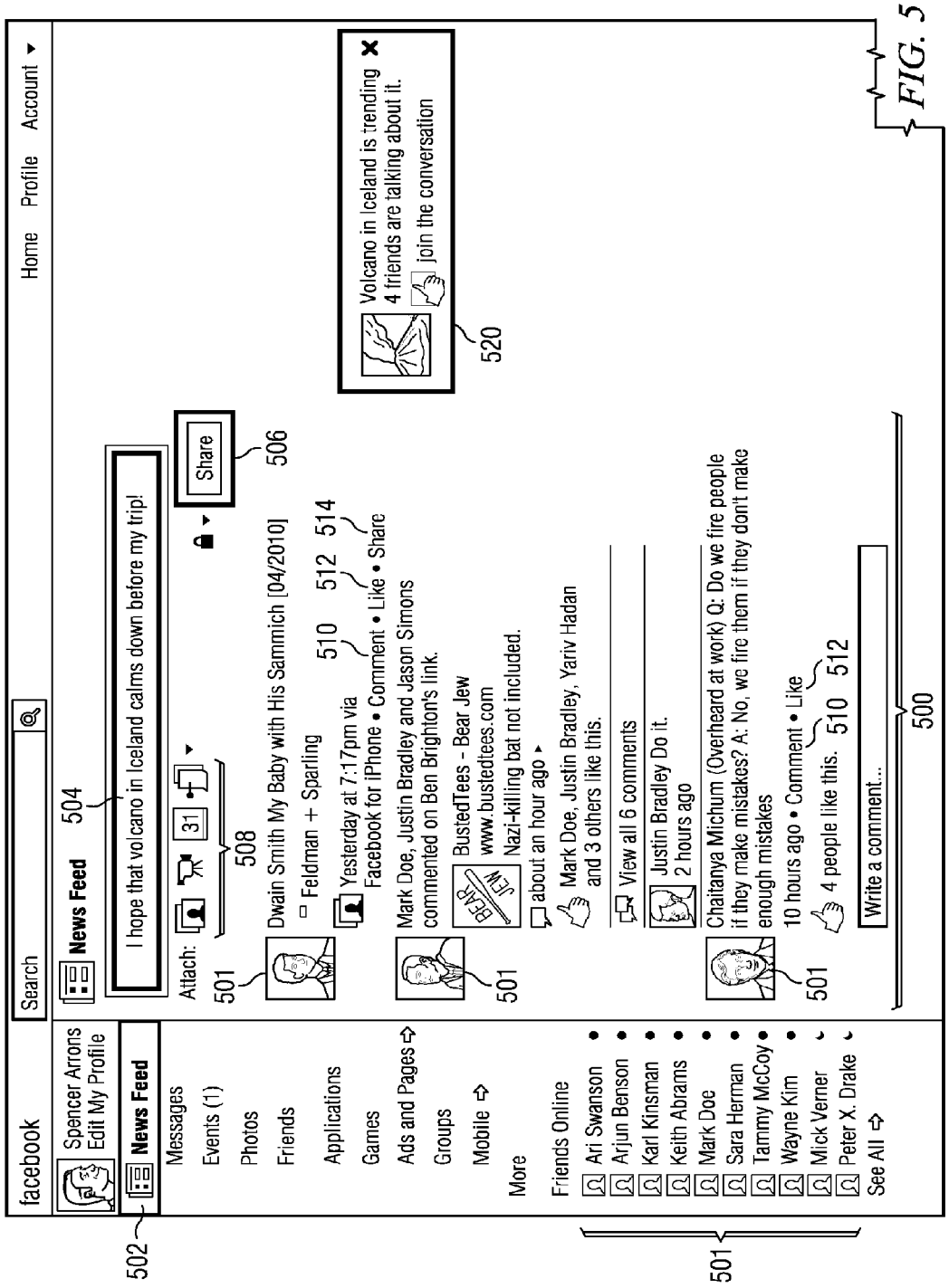
FIG. 5 illustrates an example user home page.

FIG. 5 illustrates an example homepage of a user. Generally, a user homepage is only visible to the user for which the homepage was created Like a user profile page, a user homepage may display various information to the user and may include a number of selectable or interactive elements. By way of example, in the illustrated embodiment, the main portion or body of the page is displaying a feed or news feed 500 including status updates submitted by friends (indicated by user avatars or thumbnail images 501) of the user as well as posts including, by way of example, messages, comments, or other content posted by friends of the user. In one embodiment, the news feed 500 is by default displayed to the user upon accessing and rendering the homepage. In other embodiments, other information may be shown by default. In still other embodiments, the user may configure settings via the homepage that determine what information is presented to the user upon accessing his or her homepage. The news feed 500 may also be accessed by clicking or otherwise selecting news feed link 502. While the news feed 500 is displayed, the user may post messages and content that, when submitted, are virtually instantaneously viewable within the news feed 500 as well as, in particular embodiments, the news feeds of friends of the user or other users, and particularly users that are connected to the user. The user may post a message by typing the message within input box 504 and subsequently clicking or selecting the share button 506, which results in the post being submitted to servers 22 of social network environment 20.

In the illustrated embodiment, the user may also attach various media including, by way of example, documents, photos, videos, or audio clips, to the message or post using attach elements 508. The news feed 500 also displays posts from other users, particularly posts and comments from friends of the user. The user may comment on posts or other comments on posts (again comments and any other communications are also referred to as and treated as posts) by other users via interactive elements rendered next to, below, or in proximity to the respective post, comment, or other user's image 501. By way of example, the user may comment on a post or comment using an interactive element 510, which may result in an input box (e.g., a text input box) being rendered below or in proximity to the post or comment enabling the user to enter and submit text or other content. The user may also indicate that he or she likes a post or other comment using an interactive element 512 or share a post with other users via interactive element 514.

In particular embodiments, posts submitted by users via web pages or web applications supported, hosted by, or accessible in social network environment 20 are communicated to server 22 of social network environment 20 via AJAX (Asynchronous JavaScript and XML) or other suitable techniques, and particularly, asynchronous techniques. More particularly, any submissions of posts by a user are communicated to social network environment 20 (e.g., servers 22) via AJAX or other asynchronous or suitable techniques. Similarly, the posts rendered in the news feed of the user's home page or the feed section of the wall of the user's profile page may be updated dynamically in real time (as described below) with new posts and comments transmitted to the user's client device via AJAX or other asynchronous or suitable techniques.

Additionally, in some embodiments, a post may be submitted by a user from a source or service external to social network environment 20, such as, by way of example, via a third-party website, web page, or web application such as, for example, TWITTER or other blogging service. In particular embodiments, posts made using such third-party services may be automatically imported into and received by social network environment 20. By way of example, a user posting messages or content using a third-party service may indicate that he or she would like to share the post with social network environment 20 via an interactive element presented to the user via the third-party service. The user's post submitted via the third-party service may then appear as a post in, for example, the feed section 432 of the user's profile page or news feed section of the user's home page. In alternate embodiments, social network environment, and particularly servers 22, may include one or more APIs that automatically directly extract posts of users of both the third-party service and social network environment 20 from the third-party service such that they are viewable via the user's respective profile or other pages.

In particular embodiments, social network environment 20 maintains a post database 210 in or accessible by data store 24. In particular embodiments, social network environment 20, and particularly one or more of servers 22, includes a post indexing module 208 that stores and maintains in post database 210 the content of each post (which may also include content or comments made or submitted about a post) received by social network environment 20 as well as identifying information such as, by way of example, information identifying the user who submitted the post, the time the post was submitted by the user or received by social network environment 20, the geographic location of the user or the client device 30 the user used to submit the post, the IP address of the user's client device, one or more terms extracted from the post, among other suitable or appropriate metadata. In particular embodiments, social network environment 20, and particularly one or more of servers 22, further includes a topic analyzer 212 that populates and maintains a topic database 214 within or accessible by data store 24 that includes an index of topics identified by topic analyzer 212 through extracting or interpreting topics from posts received from users by servers 22 or topics extracted from other information sources.

In particular embodiments, data store 24 is a content storage and retrieval system that is structured to utilize the social graph information in social graph database 204 to structure the information stored within it or accessible by it, including post database 210 and topic database 214. In particular embodiments, one or more stores, databases, data structures, or indexes within data store 24, and particularly post database 210, store content or information such that the content or information is organized, at least in part, by the user who generated, authored, published, or otherwise posted or submitted the content. In particular embodiments, the indices in post database 210 are additionally organized with respect to the real time submission or receipt of posts such that the post content is organized temporally as well as by the user who posted the content. In some embodiments, the content may further be organized or indexed by the web page, web application, or web service used by the user to post the content as well as by other criteria.

In one embodiment, post database 210 includes or utilizes a user-term index 216 that is an index of content received in posts from users or voices of other nodes. As described above, a post may take a variety of forms depending on, for example, how and via which web page, web application, or web service the post was entered or uploaded and submitted to servers 22. In one embodiment, user-term index 216 includes storage partitions that each include one or more temporal databases (shards). A database shard is a selected group of records and in particular embodiments, each database shard is selected with respect to a predefined time period. Each temporal database includes an index of posts and content in posts received over a particular time period. In particular embodiments, the index of posts and content in each temporal database is indexed by the user that submitted the post as well as by term identifiers. In one embodiment, user-term index 216 stores for each user a posting list that includes a list of term identifiers of terms included in one or more of the user's posts as well as, for each term identifier, a list of post identifiers in which the term is found.

Post database 210 may also include a post content store 218 comprising a large allocation of addressable memory that stores post content, such as textual terms or other content in posts. In one embodiment, a term from a post in a particular time period is parsed and indexed into a corresponding temporal database shard in user-term index 216 and the term is stored in the content store 218 with a term identifier. Post database 210 may also include a forward index 220 that identifies posts and stores a reference to the physical memory address(es) where the elements, including content and metadata, of a post are stored in content store 218.

In one embodiment, when social network environment 20, and particularly servers 22, receive a post, post indexing module 208 generates a new instance of a post object in content store 218, assigns a unique post identifier to the post, and begins to populate one or more fields of the post object with information about the post or the posting user. Indexing module 208 extracts information from the posts including, by way of example, the authoring user's user identifier and terms in or from the post. Indexing module 208 stores the post terms in user-term index 216, and stores the user identifier, post identifier, and other metadata in forward index 220. Other metadata stored in forward index may include, by way of example, the number of terms in the post, the data and time of the post, the geographic location of the authoring user, among other suitable or useful metadata. Thus, forward index 220 includes an index of the posts received by social networking environment 20, whether received internally (through interacting with web pages or web applications hosted by social networking system) or externally through third-party web pages, web sites, or web applications (e.g., TWITTER).

Indexing module 208 may extract terms from any portion of a post, including information that is not visible to the user, such as metadata. Terms that may be indexed include any content in or associated with any post. By way of example, terms may be found in and extracted from text, links, attachments, URLs, keywords stored as metadata, IP addresses, user identifiers, user nicknames, or other information social networking system has or can predict about or relate to the posting user or the subject matter of the post. Again, posts may generally include any submitted communication or declaration including wall posts, status updates, private or public messages, information entered in third-party applications, or third-party websites (e.g., blogging websites such as TWITTER), comments including comments on previously made posts, comments on photos, comments on videos, comments on links, or other comments, as well as photos, videos, links, or other uploaded or linked content. Terms may be found in, by way of example, text entered by the user in a post, previewed text from a linked web page or web site, a caption for or comment of a posted photo, video, or link, a posted URL, the title or content of a posted or linked article, etc.

Social networking environment 20, and particularly post indexing module 208, may also associate terms that are synonymous or closely related to a term extracted from a post. By way of example, a post that reads "Go Niners" may index the term "Niners" as well as "Forty-Niners," "49ers," "9ers," etc. In some embodiments, post indexing module 208 may also index related words such as, continuing the last example, "football," "San Francisco," "Candlestick," etc. In some embodiments, post indexing module 208 may also use voice, video, or image recognition technology to extract or create terms relevant to content contained in a post. Additionally, post indexing module 208 may employ conventional processes including tokenization, normalization, and expansion of terms extracted from a post. By way of example, tokenization may involve stripping and splitting terms based on punctuation and normalizing words with accents, acronyms, and possessives; normalization may involve truncating words to their bases (e.g., "running" may be truncated to "run"); and expansions may involve expanding a term to include additional forms (e.g., "run" may be expanded to "runs," "runner," or "running").

Social network environment 20, and particularly servers 22, further includes a real time search engine 222 that queries forward index 220 and user-term index 216. As will be described in more detail below with reference to the flowchart of FIG. 6, in response to a query submitted for related posts matching a particular post or post topic, real-time search engine 222 searches user-term index 216 and compiles post identifiers from matching posts in user-term index 216 and uses the post identifiers to access forward index 220 and obtain the storage locations in content store 218 for the matching posts. The search of the user-term indices can be performed in parallel across several of the temporal databases. The search results may then be ranked, for example, by relevance (e.g., topic) and time, for presentation to the user for which the search was performed. More details of the forward index, user-term index, and real-time search engine can be found in U.S. patent application Ser. No. 12/704,400, filed 11 Feb. 2010, and titled REAL TIME CONTENT SEARCHING IN SOCIAL NETWORK, which is hereby incorporated by reference herein.

When social network environment 20 receives a post submitted by a user, post indexing module 208 parses and stores the post as described above. Additionally, topic analyzer 212 extracts one or more topics from the post. The extraction of topics from the post may involve one or more of a number of known topic identification technologies. By way of example, topic analyzer 212 may work in conjunction with post indexing module 208 to extract one or more topics from one or more terms identified by post indexing module 208. Topic analyzer may then associate a topic identifier to the topic and store the topic identifier in topic database 214 along with identifying information and metadata including the post, or post identifier, associated with the post the topic was extracted from. Additionally or alternately, each post identifier stored in forward index 220 may have a topic identifier stored with it. Additionally, in some embodiments, posts may include photos, other images, video clips, or audio clips, among other media, and hence, topics analyzer 212 may be configured to identify the one or more topics from a post that comprises an image, video, or audio clip by matching the image, video, or audio clip with one or more images, videos, or audio clips in a database of images, videos, or audio clips using image, video, or audio recognition technology or in conjunction with other processes configured to use image, video, or audio recognition technology. Each of the images, videos, or audio clips in the database of images, videos, or audio clips may be, in turn, previously matched with one or more topics in the database of topics.

In particular embodiments, topic analyzer 212 may analyze the topics extracted from received posts in real-time to identify trends or trending topics; that is, topics that are currently popular or otherwise generating interest among all or a subset of users as determined by, for example, the number of posts submitted around a topic, the number of users posting on the topic, and the frequency of such posts, among other factors. A trending topic as used herein may be a word, phrase, or topic that is posted a plurality of times and by a plurality of user of social network environment 20 and thus determined to be popular among all or a subset of users of social network environment 20. Trending topics may become popular either through a concerted effort by users or because of an event that prompts people to post about a topic related to the event. By way of example, trending topics may include social events such as a concert, sporting events such as the National Basketball Association Championship Series, or other current events such as the eruption of the Icelandic volcano Eyjafjallajokull in 2010. In one embodiment, trending topics may be stored separately in topic database 214. In another embodiment, the topic identifiers of topics determined to be trending topics may be flagged or otherwise indicated in topic database 214.

The identification of trending topics may be based on any suitable algorithm or algorithms. By way of example, trending topics may be identified based on identifying bursts of related activity such as described in BURSTY AND HIERARCHICAL STRUCTURE IN STREAMS by Jon Kleinber and presented in The Proceedings of the 8th ACM SIGKDD International Conference on Knowledge Discovery and Data Mining, 2002, which is hereby incorporated by reference herein. By way of example, for every topic that appears in topics database 214, topics analyzer 212 computes all of the bursts in the streams of posts containing the topic. Combined with a method for computing a weight associated with each burst, and then for ranking by weight, this essentially provides a way to find the topics that exhibit the most prominent rising and falling pattern (a "trend") over a limited period of time. In particular embodiments, the Kullback-Leibler divergence may additionally or alternately utilized to identify bursts of activity for purposes of identifying trending topics.

Figure 6:
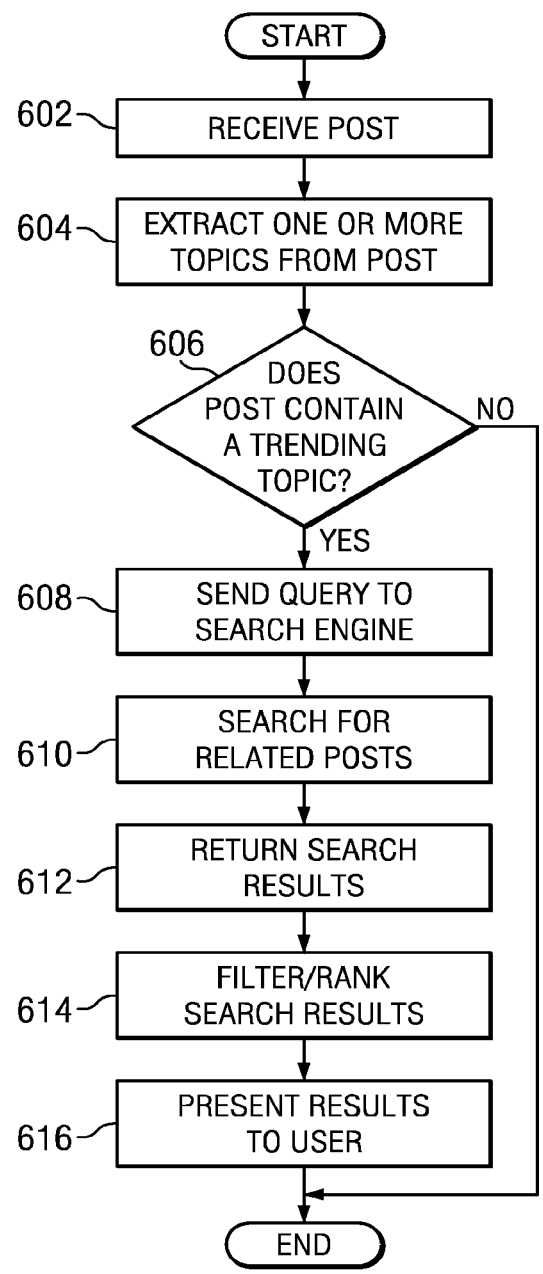
FIG. 6 shows a flowchart illustrating an example method for searching for, identifying, and presenting related posts to a user in response to a post submitted by the user.

FIG. 6 shows a flowchart illustrating a method or process 600 for searching for, identifying, and presenting related posts to a user in response to a post submitted by the user. In particular embodiments, process 600 begins when social network environment 20 receives at 602 a post submitted by a user (the "posting user"). Again, a post may include all content (e.g., text, image, video, audio, hyperlink, etc.) associated with a particular communication and, generally, content refers to anything that may be stored by social network environment 20. By way of example, the post may be, include, or take the form of: a status update entered via the user's home or profile page; a post of a message or content entered via the user's home or profile page; a post of a message or content entered and submitted via another user's profile page, a concept profile page, a topic profile page, or other web page or web application; a comment entered and submitted by the user on another post or comment submitted by another user; a comment or caption added to a photo, video, or other media content, as well as a photo, other image, video clip, or audio clip themselves, and the like. By way of example, as described above with respect to FIG. 5, a user may type or otherwise enter text via input box 504 as well as attach various media using interactive elements 508, and subsequently submit the post via share button 506. In the example illustrated in FIG. 5, the posting user types a message "I hope that volcano in Iceland calms down before my trip!" in input box 504 and subsequently submits/posts the message by clicking the share button 506. Again, the post may be transmitted to servers 22 using AJAX and more particularly, using an XMLHTTPRequest enabling quick and dynamic sending and fetching of results as described below.

When social network environment 20 receives the post at 602 submitted by the posting user, post indexing module 208 parses and stores the post as described above. Additionally, topic analyzer 212 extracts at 604 one or more topics from the post. By way of example, considering the example of FIG. 5, the extracted topic may be the volcano in Iceland. In one particular embodiment, topic analyzer 212 then determines at 606 if any of the topics extracted from the post is a trending topic. By way of example, topic analyzer 212 may search topic database 214 for topics matching the extracted topic and determine if one or more matching topics are trending topics. In one embodiment, if topic analyzer 212 determines at 606 that a topic extracted from the post is a trending topic, topic analyzer 212 then sends at 608 a query to search engine 222 containing the topic identifier of the trending topic. Search engine 222 then searches at 610 for related posts matching the topic extracted from the posting user's post according to various criteria, which may, at least partially, be set by the posting user. In one embodiment, search engine 222 searches user-term index 216 for terms that match, define, or relate to the extracted topic and compiles post identifiers from matching posts in user-term index 216 and uses the post identifiers to access forward index 220 and obtain the storage locations in content store 218 for the matching posts. Search engine 222 then returns one or more related posts to ranking module 224 at 612. In particular embodiments, by default or based on the posting user's indicated preferences, search engine 222 may only search for or return related posts that were posted by friends of the user, friends of friends of the user, all users, all users within a defined geographic location or region, or users of the same language, or users within one or more network groups, such as groups the posting user is in. Additionally, search engine 222 may only search for or return related posts transmitted within a predefined period of time relative to the posting user's post.

In particular embodiments, ranking module may then filter or rank one or more of the returned posts at 614 according to various criteria, which may, at least partially, be set by the posting user, especially if the number of returned results (related posts) is large. By way of example, ranking module may filter out posts that were not posted by friends of the user, friends of friends of the user, users within the same geographic location or region, or users of the same language, or users within one or more of the same network groups the posting user is in. Additionally, ranking module may filter out posts received previous to a defined period of time relative to the posting user's post. Ranking module 224 may use the same filtering criteria to rank the related posts that are to be communicated to the posting user. By way of example, ranking module 224 may rank one or more related posts to be presented to the posting user based on how closely their topics match the topic of the posting user's post, how recently the related posts were received by social network environment 20, the relationship of the content of the related posts to the interests of the posting user (e.g., as determined by analyzing the posting user's profile), whether the authoring user's of the related posts are friends of the user, the social proximity of the authoring user's of the related posts to the posting user in the social graph, the geographic proximity of the authoring user's of the related posts to the posting user, the language of the related posts, the popularity of the related posts themselves (e.g., have other user's been viewing and commenting on the related posts), the popularity of the topics extracted from the related posts (e.g., is popularity above a threshold), among other suitable criteria.

Ranking module 224 then passes the related posts that are to be presented to the posting user to page-generating process 200, which then formulates and transmits at 616 one or more responses containing markup language code or other code segments for rendering the related posts, information regarding the related posts, or information regarding the authoring users of the related posts, as well as, in particular embodiments, one or more code segments for rendering and implementing one or more interactive elements for presentation with the respective related posts. By way of example, referring back to FIG. 5, where the user had posted about the volcano in Iceland, in one embodiment the user is presented with a trending topic UI 520 that reads "Volcano in Iceland is trending." In the illustrated embodiment, UI 520 also informs the posting user that four of the posting user's friends are also posting about the Volcano in Iceland. UI 520 may also include a number of interactive elements including a "Join the conversation" interactive element that, when clicked or selected, directs the user to a web page directed to the erupting Icelandic Volcano where the user can post and comment on other user's posts and comments, and particularly posts and comments from friends of the user who are also posting about the topic of the web page (the erupting Icelandic Volcano).

Such a web page may be referred to as a topic web page or topic profile page and is illustrated, by way of example, in FIG. 7. Topic profile pages may be or be similar to concept profile pages or hubs as described in U.S. patent application Ser. No. 12/763,171 filed 19 Apr. 2010 and titled INTEGRATED SOCIAL NETWORK ENVIRONMENT, U.S. patent application Ser. No. 12/763,162 filed 19 Apr. 2010 and titled AUTOMATICALLY GENERATING NODES AND EDGES IN AN INTEGRATED SOCIAL GRAPH, U.S. patent application Ser. No. 12/763,145 filed 19 Apr. 2010 and titled AUTOMATICALLY GENERATING NODES AND EDGES IN AN INTEGRATED SOCIAL GRAPH, and U.S. patent application Ser. No. 12/763,132 filed 19 Apr. 2010 and titled DYNAMICALLY GENERATING RECOMMENDATIONS BASED ON SOCIAL GRAPH INFORMATION, which are hereby incorporated by reference herein. In one embodiment, a topic profile page could have an associated topic node similar to how a hub has an associated concept node. However, in one embodiment, topic profile pages and corresponding topic nodes are ephemeral as they only "live" as long as they are trending; that is, in one embodiment, once the topic associated with a topic node is no longer trending, the topic node and corresponding topic profile page may be deleted, or deleted after a period of time has lapsed since the topic was determined not to be trending, or still alternately, the topic node and corresponding topic profile page may continue to exist and, in some embodiments, may transition to a "historical event" or other classification. Similar to a hub, users may become fans of topic profile pages and declare "likes" to topic profile pages, and in some embodiments, even cause edges to be created between their respective user nodes and topic nodes. Users may also post content such as in a description section 722 of the topic profile page or add a profile photo 724. Additionally or alternately, social network environment may extract or import information from a third-party site such as an information site (e.g., www.wikipedia.org) or an online news site (e.g., www.msnbc.com) to populate a topic profile page and generally show current event information for the particular topic. The topic profile page may also display users, or more particularly, the profile pictures (e.g., avatars) 726 and names 728 of users, who are fans of the respective topic of the page or who have posted about the topic of the page.

In the embodiment illustrated in FIG. 7, the posting user may post messages and content and otherwise interact with other users posting about the topic via typing text in input box 730, attaching or uploading content via interactive elements 732, and submitting the text or content via share button 734. As described above, a goal of particular embodiments is to present to the posting user related posts (as described above) from other users sharing the same topic. In the embodiment illustrated in FIG. 7, the topic profile page includes a wall, feed, or news feed section 736 that include a sub-section feed 738 that displays related posts by friends of the posting user and a sub-section feed that displays related posts selected from all users. In one embodiment, the feeds 738 and 740 may be updated in real-time in response to new posts about the topic. In other embodiments, the feeds 738 and 740 may be updated in response to actions taken by the posting user on the topic page such as, for example, posting a new post on the topic via input box 730, posting new content (e.g., photos, video clips, audio clips, links, etc.) about the topic via interactive elements 732, or by interacting with one or more of the related posts in feeds 738 or 740 via interactive elements 742, 744, and 746, for example, enabling the posting user to comment, declare a like, or view feedback regarding a related post, respectively. It should also be appreciated that, any posts submitted with respect to related posts are also added to post database 210 and their respective topics are also added to topic database 214, and in particular embodiments, in real-time. In this way, trending topics are always up to date and accurate.

In some embodiments, the one or more responses formulated and transmitted by page-generating process 200 at 616 may additionally or alternately cause one or more related posts to be displayed within UI 520 itself and furthermore, with interactive elements to comment, like, share, or otherwise interact with the related posts or the authoring users of the related posts, which may also be displayed (via profile pictures or names) within UI 520. Furthermore, as the user may post on pages other than his or her profile or home page, UI 520 may be rendered on any page in which the posting user submits a post. In other embodiments, the one or more responses formulated and transmitted by page-generating process 200 at 616 may additionally or alternately cause one or more related posts to be displayed within wall (feed) section 432 of the user's profile page or news feed 500 of the user's homepage and furthermore, with similar interactive elements to comment, like, share, or otherwise interact with the related posts or the authoring users of the related posts, which may also be displayed (via profile pictures or names) within these sections.

Additionally, although in the embodiment described with reference to FIG. 6, related posts or related post information was only displayed if the topic of the posting user's post was determined to be a trending topic, in other embodiments, social network environment 20 may search for, identify, and present to the user related posts regardless of whether or not the topic of the posting user's post is determined to be a trending topic.

Furthermore, in particular embodiments, when the posting user comments on or otherwise interacts with a related post presented to the posting user in response to the posting user's post, the authoring user of the related post may be notified. By way of example, the posting user's comment may be displayed in the wall section 432 or news feed section 500 of the profile or home pages of the authoring user of the related post. Additionally or alternately, the authoring user of the related post may be present with a UI 520 encouraging and enabling the authoring user of the related post to interact with other users authoring related posts.

Moreover, as described earlier, similar processes and techniques may be used to identify topics relating to user actions such as, by way of example, typing a word or words in a search box in a presented page, clicking on a hyperlink that redirects the user to another page, or visiting another page in general. In such cases, topic analyzer 212 may analyze the text input into the search box, or analyze the content of the page the user is requesting (e.g., a title, name or other identifier of the page, content in or associated with the page, descriptive information in the page, particular users that are connected to the page, particular friends of the user that are connected to the page), to identify one or more topics from the search or page request. The methods or processes for identifying and presenting posts, or post information, related to the topic or topics identified based on the search or page request may then proceed as described above.

The applications or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 8:
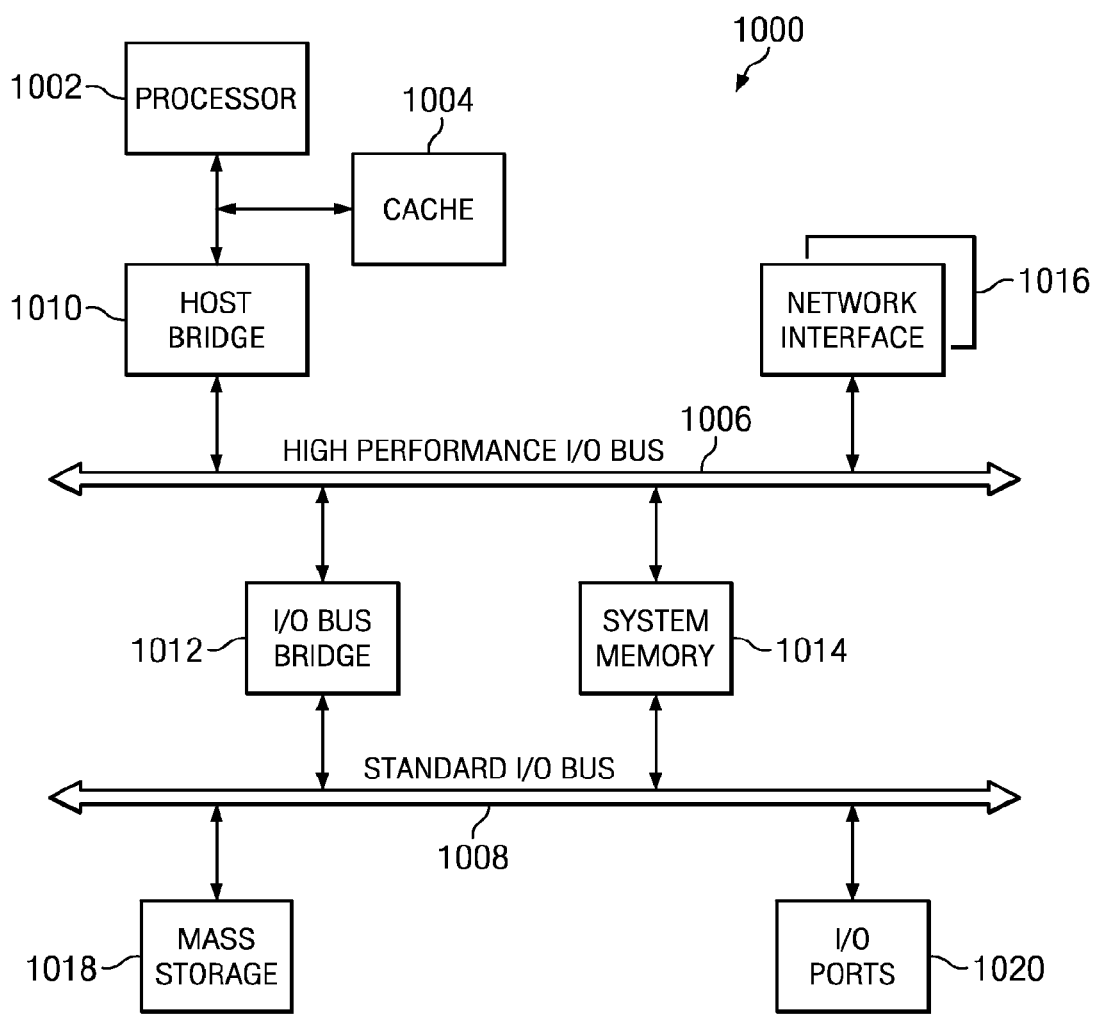
FIG. 8 illustrates an example computer system architecture.

FIG. 8 illustrates an example computing system architecture, which may be used to implement a server 22a, 22b. In one embodiment, hardware system 1000 comprises a processor 1002, a cache memory 1004, and one or more executable modules and drivers, stored on a tangible computer readable medium, directed to the functions described herein. Additionally, hardware system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network/communication interfaces 1016 couple to bus 1006. Hardware system 1000 may further include video memory (not shown) and a display device coupled to the video memory. Mass storage 1018, and I/O ports 1020 couple to bus 1008. Hardware system 1000 may optionally include a keyboard and pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, etc. Mass storage 1018 provides permanent storage for the data and programming instructions to perform the above-described functions implemented in the servers 22a, 22b, whereas system memory 1014 (e.g., DRAM) provides temporary storage for the data and programming instructions when executed by processor 1002. I/O ports 620 are one or more serial and/or parallel communication ports that provide communication between additional peripheral devices, which may be coupled to hardware system 1000.

Hardware system 1000 may include a variety of system architectures; and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present invention may not require nor include all of the above components. For example, the peripheral devices shown coupled to standard I/O bus 1008 may couple to high performance I/O bus 1006. In addition, in some embodiments, only a single bus may exist, with the components of hardware system 1000 being coupled to the single bus. Furthermore, hardware system 1000 may include additional components, such as additional processors, storage devices, or memories.

In one implementation, the operations of the embodiments described herein are implemented as a series of executable modules run by hardware system 1000, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 1002. Initially, the series of instructions may be stored on a storage device, such as mass storage 1018. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 1016. The instructions are copied from the storage device, such as mass storage 1018, into memory 1014 and then accessed and executed by processor 1002.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

The invention claimed is:

1. A method comprising:
by one or more computing devices, receiving an indication of a first user action by a first user; and
by one or more computing devices, when the indication is received:
   determining a topic of the first user action based at least in part on analyzing content associated with the first user action;
   determining whether the first user has indicated a preference to exclude posts associated with the topic or a category associated with the topic; and
   in response to a determination that the first user has not indicated any preference to exclude posts associated with the topic or the category, then:
      identifying a second user action by a second user and related to the topic;
      determining whether the first user has indicated a preference to exclude posts associated with the second user; and
      in response to a determination that the first user has not indicated any preference to exclude posts associated with the second user, sending to the first user a reference associated with the second user action, wherein the reference is configured to enable the first user to interact with the second user action.

2. The method of claim 1, wherein the first user action is the submission of a first post.

3. The method of claim 2, wherein the first post comprises one or more of:
   a status update declared by the first user on a profile page of the first user;
   a wall post declared on a profile page of the first user;
   a wall post declared on a profile page of the second user;
   a declared comment on a status update declared by the second user;
   a declared comment on a wall post declared by the second user; or
   an indication or declaration by the first user of a like of a user action.

4. The method of claim 2, wherein identifying the topic from the first post comprises matching one or more words in the first post with one or more words in a database of topics.

5. The method of claim 4, wherein the database of topics is updated dynamically based on user posts as the posts are declared and received by the one or more computing systems.

6. The method of claim 1, wherein the first and second users are users of a social-networking system, the social-networking system comprising a graph that comprises a plurality of nodes and edges connecting the nodes, at least one node in the graph corresponding to the first user, at least one node in the graph corresponding to the second user, at least one of the nodes corresponding to the first user and at least one of the nodes corresponding to the second user being connected to each other by an edge.

7. The method of claim 6, wherein identifying one or more second user actions that relate to the topic comprises identifying one or more second user actions that relate to the first topic and which were posted by respective second users that each have a defined social relationship to the first user.

8. The method of claim 1, wherein the first user action is the submission of text in a search box.

9. The method of claim 1, wherein the first user action is a selection of a hyperlink or other action that results in a request for a web page.

10. The method of claim 1, wherein identifying one or more second user actions that relate to the topic comprises matching one or more words related to the first topic with one or more words in each of a plurality of user posts in a database of user posts.

11. The method of claim 1, wherein identifying one or more second user actions that relate to the topic comprises determining whether or not the topic is a trending topic.

12. A system comprising:
   one or more processors; and
   a memory coupled to the processors comprising instructions executable by the processors, the processors being operable when executing the instructions to:
   receive an indication of a first user action by a first user; and
   when the indication is received:
      determine a topic of the first user action based at least in part on analyzing content associated with the first user action;
      determine whether the first user has indicated a preference to exclude posts associated with the topic or a category associated with the topic; and
      in response to a determination that the first user has not indicated any preference to exclude posts associated with the topic or the category, then:
         identify a second user action by a second user and related to the topic;
         determine whether the first user has indicated a preference to exclude posts associated with the second user; and
         in response to a determination that the first user has not indicated any preference to exclude posts associated with the second user, send to the first user a reference associated with the second user action, wherein the reference is configured to enable the first user to interact with the second user action.

13. The system of claim 12, wherein the first user action is the submission of a first post.

14. The system of claim 13, wherein the post comprises one or more of:
   a status update declared by the first user on a profile page of the first user;
   a wall post declared on a profile page of the first user;
   a wall post declared on a profile page of the second user;
   a declared comment on a status update declared by the second user;
   a declared comment on a wall post declared by the second user; or
   an indication or declaration by the first user of a like of a user action.

15. The system of claim 13, wherein identifying the topic from the first post comprises matching one or more words in the first post with one or more words in a database of topics.

16. The system of claim 15, wherein the database of topics is updated dynamically based on user posts as the posts are declared and received by the one or more computing systems.

17. The system of claim 12, wherein the first and second users are users of a social-networking system, the social-networking system comprising a graph that comprises a plurality of nodes and edges connecting the nodes, at least one node in the graph corresponding to the first user, at least one node in the graph corresponding to the second user, at least one of the nodes corresponding to the first user and at least one of the nodes corresponding to the second user being connected to each other by an edge.

18. The system of claim 17, wherein identifying one or more second user actions that relate to the topic comprises identifying one or more second user actions that relate to the first topic and which were posted by respective second users that each have a defined social relationship to the first user.

19. The system of claim 12, wherein the first user action is the submission of text in a search box.

20. One or more computer-readable non-transitory storage media embodying software that is operable when executed to:
   receive an indication of a first user action by a first user; and
   when the indication is received:
      determine a topic of the first user action based at least in part on analyzing content associated with the first user action;
      determine whether the first user has indicated a preference to exclude posts associated with the topic or a category associated with the topic; and
      in response to a determination that the first user has not indicated any preference to exclude posts associated with the topic or the category, then:

identify a second user action by a second user and related to the topic;

determine whether the first user has indicated a preference to exclude posts associated with the second user; and in response to a determination that the first user has not indicated any preference to exclude posts associated with the second user, send to the first user a reference associated with the second user action, wherein the reference is configured to enable the first user to interact with the second user action.

\* \* \* \* \*